Dec. 12, 1967 G. MATHUS 3,357,546

CASE FOR REELS

Filed July 21, 1966

INVENTOR.

BY Gregory Mathus

Wolf, Greenfield & Hieken

ATTORNEYS

United States Patent Office 3,357,546

Patented Dec. 12, 1967

3,357,546

CASE FOR REELS

Gregory Mathus, West Hartford, Conn., assignor to Data Packaging Corp., Cambridge, Mass., a corporation of Massachusetts Filed July 21, 1966, Ser. No. 566,987

6 Claims. (Cl. 206—52)

ABSTRACT OF THE DISCLOSURE

A reel case having a rotatably mounted handle on the cover with a transparent plastic rod extending through its gripping bar which is aligned with a color coating on the cover when the handle is in its locked position to indicate that condition.

This invention relates to cases for tape reels and more particularly comprises a case having a lock with an improved indicator for showing the condition of the lock and means for revealing the contents of the case.

Reel cases of the type forming the subject matter of the present application have become a standard in the computer field for housing magnetic tape reels. A number of developments have been made to improve the locks of reel cases, the indicating means for revealing to the operator whether or not the locks are open or closed, and the manner of assembling the cases. The present invention relates primarily to the indicating means which may be incorporated into both the older types of cases as well as the newest case constructions for revealing the condition of the lock.

The design of reel cases to which the present invention relates is of considerable importance and a great deal of work has been done by the various manufacturers in the field to make their products most attractive. Some of the design features are achieved by mixing opaque and transparent plastic parts. In accordance with the present invention, mechanical features are incorporated into the case which enable a wider use of opaque plastic parts.

In accordance with the present invention a light conductor is provided in the handle for channeling the light rays from a indicator disposed beneath the handle to give the effect of an indicating light when the handle is in the locked position. The conductor is incorporated into the handle grip and it directs the light rays to the top surface of the case. In this position, the indicator is most conveniently seen even when the handle is operated.

In accordance with another concept of the present invention, the periphery of the base of the case if free of any significant upwardly extending skirts or flanges which ordinarily are present and enclose the periphery of a reel placed in the case. The periphery of the case is sealed by a downwardly extending skirt provided at the periphery of the case cover. A single skirt forms the seal at the periphery, and that seal is made of a transparent material. Therefore, the reel and tape wound on it are visible from the side of the case. Accordingly, the case may be made with an opaque base and transparent cover and still reveal the color of the reel packaged in the case when the case is placed on end on a shelf, rack or other support.

These and other features and objects of this invention along with its incident advantages will be better understood and appreciated from the following detailed description of one embodiment thereof, selected for purposes of illustration and shown in the accompanying drawing, in which.

Figures 1, 2, 3, 4:
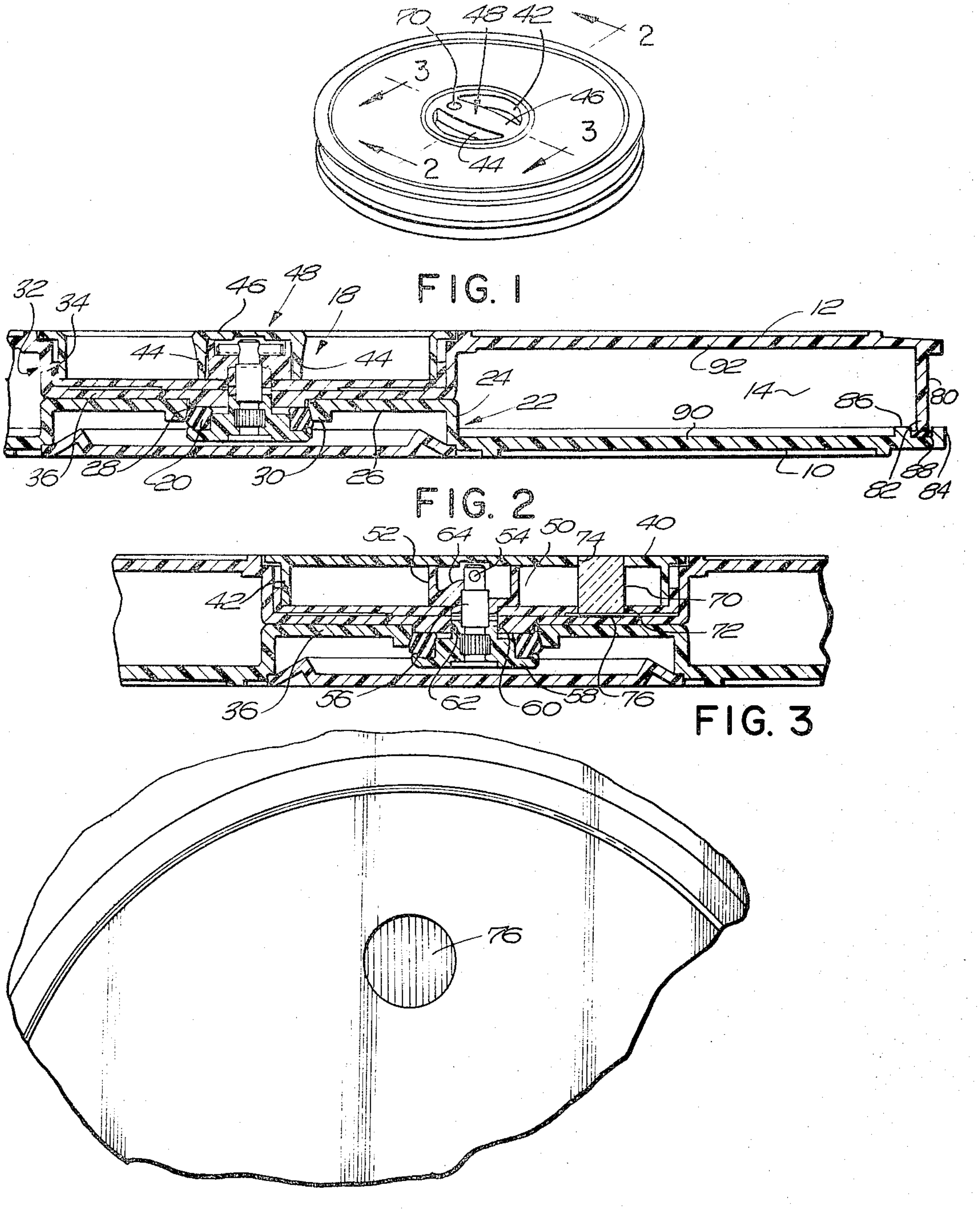
FIG. 1 is a perspective view of a case constructed in accordance with this invention.
FIG. 2 is a fragmentary cross-sectional view taken along the section line 2—2 in FIG. 1.
FIG. 3 is a fragmentary cross-sectional view taken along the section line 3—3 in FIG. 1.
FIG. 4 is a fragmentary plan view of a portion of the case.

The case shown in the drawing includes a base 10 and a cover 12 which when closed define an annular chamber 14 for housing a reel. The base and cover are secured together by a locking device 16 that includes a handle 18 and an expansible grommet 20.

The base 10 is provided at its center with an upwardly extending well 22 defined by a cylindrical wall 24 and a flat top wall 26. An opening 28 is provided in the center of the top wall 26 through which the expansible grommet 20 forming part of the locking device extends when the cover and base are in their assembled position. The edge of the opening 28 is strengthened by a collar 30 formed as an integral part of the wall.

The cover 12 is provided with a downwardly extending well 32 defined by a cylindrical side wall 34 and a bottom wall 36. The well 32 in the cover provides a chamber for the handle 18.

The handle 18 includes a bottom disc 38 which is seated on the bottom wall 36 of the well 32 and a top 40 composed of a cylindrical side wall 42 secured to the periphery of the disc 38, and a pair of generally parallel side gripper panels 44 and a top gripper panel 46 that together define the gripper bar 48 of the handle.

The side panels 44 and the top panel 46 of the gripper bar 48 cooperate with the bottom disc 38 of the handle to form a closed chamber 50 within which is mounted a cam 52. The cam 52 cooperates with a pin or cam follower 54 carried by a stud 56 to raise and lower a keeper 58 which operates on the expansible grommet 20. The expansible grommet 20 is shown in FIGS. 2 and 3 to bear against the lower surface of the bottom wall 36 of the cover well 32, and when the keeper is pulled upwardly by the action of the cam and follower, the grommet 20 is compressed against the bottom wall 36 and expands. The keeper 58 has a noncircular boss 60 provided in its top disposed in a noncircular opening 62 in the bottom wall 36 of the cover well 32 to prevent the keeper from rotating. Consequently, rotation of the cam 52 with the handle 18 causes the cam follower pin 54 to ride over the cam surface 64 to either raise or lower the keeper. When the keeper is lowered as the cam follower 54 moves to the low position of the cam face 64, the expansible grommet 60 is relaxed and therefore contracted so that it can fit through the opening 28 in the top wall 26 of the base well. To lock the cover and base together, the handle is rotated to a position wherein the pin 54 lies on the high portion of the cam face 64, and the expansion of the grommet which results causes the grommet to bear against the periphery of the opening 28 and prevent it from being withdrawn.

It is important that a case be provided with some means for indicating to the operator whether or not the lock is closed. In the absence of such an indicator, an operator may assume the case is locked when in fact it is not and lift the case by grasping the cover. This will permit the base to fall from the cover and the reel in turn may spill from the base. The tape wound upon the reel may in turn become contaminated with dust particles which are recognized in the art to be most harmful. In certain applications even a few particles of dust on a tape may produce drop outs in sufficient numbers to render the tape worthless.

In accordance with the present invention, the indicating means provided in the gripper bar 48 is composed of a transparent plastic rod 70 which extends through an opening 72 in the disc 38 of the handle and an opening 74 in the handle top panel 46. An iridescent coating 76 of some bright color is carried on the upper surface of the bottom wall 36 of the cover well 32 and is positioned to lie directly beneath the rod 70 when the handle is in its locked position. That is, when the handle is turned to a position wherein the cam follower 54 lies on a high position on the came face 64, the transparent plastic tube 70 lies immediately above the color coating 76.

The Lucite rod acts as a prism to funnel the light from the iridescent coating 76 and will indicate to the operator that the handle is locked when the top of the rod 70 appears to be lighted. When the handle 18 is turned so as to allow the cam follower 54 to lie in a low position and the grommet 20 is no longer expanded to lock in the opening 28, no color appears through the rod 70 as an indication that the handle is in fact locked.

The coating 76 may be applied by paint, or it may be applied in the form of a brightly colored disc secured to the surface of the bottom wall of the well. It is apparent that whatever form the coating takes, when it is aligned with the rod 70, it will appear as a light at the upper surface of the rod in the plane of the top 40 of the gripper bar. It is evident from an inspection of FIG. 1 that a light appearing at the rod 70 will be readily viewed by the operator when the case is handled.

In FIG. 1 the case cover 12 is shown to include a downwardly extending skirt 80 at its periphery which defines the side wall of the assembled case. The lower end 82 of the skirt 80 rests in a very shallow trough defined by a pair of low ribs 84 and 86 formed at the periphery of the base 10 of the case. The shallow trough may house a gasket 88 which mates with the end 82 of the skirt 80 to form an effective seal at the periphery.

It is evident that if the cover 12 of the case is made of a transparent plastic, the reel disposed within the cavity 14 of the case will be readily viewable from the top and from the side through the skirt 80. Consequently, although the base 10 is made of an opaque plastic material, the contents of the case will be viewable without opening it, even when the case is stacked on edge on a rack and viewed only from the side. The skirt 80 will not interfere with the viewing of the reel, and nothing is carried by the base 10 to obstruct the vision. It may be noted that very often the color of the lower flange of the reel which ordinarily will sit in the base 10 serves as a coating to indicate the contents of the tape wound upon it. Therefore, it is important that the operator be able to view the bottom flange of the reel even when the reel is disposed in the case. The use of a single skirt at the case periphery made of a transparent material will allow the bottom flange of the reel disposed in the case to be viewed.

It should also be noted that ordinarily rubber gaskets are provided about the base of the wells 22 and 32 to grip the hub of a reel placed in the case and hold the reel flanges off the inner surfaces of the walls 90 and 92. Such gaskets are shown in United States Patent No. 3,074,546 dated Jan. 22, 1963 issued to Burgess et al. Such a gasket will hold the lower reel flange so that it lies above the short ribs 84 and 86.

From the foregoing description those skilled in the art will appreciate that numerous modifications may be made to the present invention without departing from its spirit. Therefore, it is not intended that the scope of this invention be determined by the specific embodiment illustrated and described. Rather, it is intended that the scope of the invention be determined by the appended claims and their equivalents.

What is claimed is:

1. A reel case comprising a cover and a base,
   a locking device including a handle rotatably mounted on the top surface of the cover with the handle having a gripper bar extending across it, said handle when turned in one direction locking the case and when turned in the other direction unlocking the case,
   a transparent plastic rod extending through the handle from its top to the surface of the cover,
   and a color coating applied to the top surface of the cover and disposed directly beneath the bottom of the rod when the handle is in the locked position to indicate that the case is locked.

2. A reel case as defined in claim 1 further characterized by
   said rod extending through the gripper bar with the upper surface of the rod in the plane of the upper surface of the bar.

3. A reel case as defined in claim 2 further characterized by
   said cover having a well in its center,
   said handle having a bottom disc and a top,
   said top having a cylindrical wall about its periphery and a pair of substantially parallel side panels and a top panel that comprise the gripper bar,
   an opening in the bottom disc,
   and an opening in the top panel aligned with the opening in the disc, the ends of the transparent rod being seated in the openings.

4. A reel case as defined in claim 3 further characterized by
   said openings being round and said rod being cylindrical.

5. A reel case as defined in claim 1 further characterized by
   said cover being made of a transparent material,
   a transparent skirt extending downwardly from the periphery of the cover and engaging the upper surface of the base of the case, said base being made of an opaque material and being free of an upwardly extending skirt whereby the interior of the case may be viewed from the side through the transparent skirt of the cover.

6. A reel case as defined in claim 1 further characterized by
   said cover including the skirt being made of a transparent plastic material and the base being made of an opaque plastic material.

References Cited

UNITED STATES PATENTS

| | | | |
|---|---|---|---|
| 819,120 | 5/1906 | Caley. | |
| 2,345,889 | 4/1944 | Talbot | 220—82 |
| 2,482,265 | 9/1949 | Gonda | 220—82 |
| 2,649,956 | 8/1953 | Knibb | 206—45.34 |
| 2,790,609 | 4/1957 | Hawthorne et al. | 206—52 |
| 3,138,250 | 6/1964 | Burgess | 206—52 |

WILLIAM T. DIXSON, Jr., *Primary Examiner.*